(12) United States Patent
Merriam (10) Patent No.: US 6,915,435 B1
(45) Date of Patent: Jul. 5, 2005

(54) METHOD AND SYSTEM FOR MANAGING INFORMATION RETENTION

(75) Inventor: Charles Merriam, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/501,332

(22) Filed: Feb. 9, 2000

(51) Int. Cl.$^7$ .............................................. H04L 9/00
(52) U.S. Cl. ..................................... 713/201; 709/223
(58) Field of Search ................................ 713/200–201, 713/160–161, 171, 193; 709/223–226, 200, 201, 203, 229; 380/201, 228–229, 259, 277–285, 28–30; 707/100, 200, 103 R, 103, 103 Y; 711/100, 163

(56) References Cited

U.S. PATENT DOCUMENTS

| | | | | |
|---|---|---|---|---|
| 5,661,807 A | * | 8/1997 | Guski et al. ................. | 713/159 |
| 5,774,551 A | * | 6/1998 | Wu et al. ..................... | 713/155 |
| 6,085,323 A | * | 7/2000 | Shimizu et al. .............. | 713/201 |
| 6,134,660 A | * | 10/2000 | Boneh et al. ................ | 713/193 |
| 6,223,285 B1 | * | 4/2001 | Komuro et al. .............. | 713/160 |
| 6,327,661 B1 | * | 12/2001 | Kocher et al. ............... | 713/193 |
| 6,424,718 B1 | * | 7/2002 | Holloway .................... | 380/277 |
| 6,463,151 B1 | * | 10/2002 | Iitsuka et al. ................ | 380/201 |
| 6,625,734 B1 | * | 9/2003 | Marvit et al. ................ | 713/201 |

FOREIGN PATENT DOCUMENTS

EP    0 575 765 A1    12/1993
WO    WO 00/65766    11/2000

* cited by examiner

Primary Examiner—Kim Vu
Assistant Examiner—Leynna Ha
(74) Attorney, Agent, or Firm—Park, Vaughan & Fleming LLP (57) ABSTRACT

An improved information retention management mechanism is disclosed wherein an information set may be purged from an information system without having to delete the information set from the system. Whenever an information set enters an information system, a key is associated with the information set. The information set is encrypted using the associated key, and the encrypted form of the information set is stored in the information system. The unencrypted form of the information set is not stored. To render the information set to a user, the encrypted form of the information set is accessed along with the associated key, and then decrypted using the associated key to derive the original information set. Once derived, the information set is rendered to the user. So long as the associated key remains in the system, this process may be carried out to render the information set to a user. At some point, in accordance with an information retention policy, the information set is selected for purging. To purge the information set, all that needs to be done is to delete the associated key. By deleting the associated key, all copies of the encrypted information set stored within the information system are made unrenderable; as a result, the information set is effectively "purged" from the system. This purging is achieved without having to delete the encrypted information set from the system.

30 Claims, 6 Drawing Sheets

METHOD AND SYSTEM FOR MANAGING INFORMATION RETENTION

BACKGROUND

This invention relates generally to information systems, and more particularly to a method and apparatus for managing information retention.

To limit the amount of information that is maintained in an information system, many companies implement policies (often referred to as information retention policies) under which information sets are systematically deleted from the system. These policies set forth criteria for determining if and when an information set is to be deleted, and are often time-based, such that an information set is deleted after having been in the system for a certain amount of time, or condition-based, such that an information set is deleted after a certain condition has been satisfied, or a combination of both. For example, a set of information may be deleted if it has been in the system for a certain amount of time AND it has not been accessed within a certain period of time. By systematically deleting information sets from the system, the system is maintained at a reasonable size. This helps to limit the amount of storage required to implement the system, and the effort needed to maintain the system.

Typically, an information retention policy is enforced by deleting from the system information sets which have been determined under the retention policy as being eligible for deletion. An information set may be deleted by removing references to the information set, thereby rendering the information set inaccessible, or by overwriting the information set with new information, or both. While removing an information set from a system by way of deletion is sound in principle, it is difficult to implement in practice. One of the main problems with the deletion method is that in order to delete an instance of an information set, it is first necessary to find it. If there are multiple copies of an information set (as is often the case if the system is large or distributed or if backup copies are made), it is necessary to find and to delete all copies of the information set before the information set is completely removed from the information system. For a large information system, it can be a tedious, daunting, and sometimes impossible task to find all copies of an information set. As a result, stray copies of an information set often linger in the system even after the information set has supposedly been deleted. These stray copies can seriously undermine the effectiveness of the retention policy. As this discussion illustrates, the current methodology for enforcing information retention policies leaves much to be desired. As a result, an improved mechanism for managing information retention is needed.

SUMMARY OF THE INVENTION

The present invention provides an improved mechanism for managing information retention in an information system. The present invention is based, as least partially, upon the observation that it is not necessary to delete an information set from a system in order to purge it. Instead, all that is necessary is to make the information set unrenderable to a user. If the information set is made unrenderable, then it is for all intents and purposes useless; as a result, it is effectively "purged" from the system, even if it remains physically in the system.

In light of this observation, the present invention provides an information retention management mechanism, whereby, whenever an information set enters an information system, a key is associated with the information set. The information set is encrypted using the associated key, and the encrypted form of the information set is stored in the information system. The unencrypted form of the information set is not stored. Then, at a later time, the information set is rendered to a user by accessing the encrypted form of the information set, accessing the associated key, and decrypting the encrypted information set using the associated key to derive the original information set. Once derived, the information set is rendered to the user. So long as the associated key remains in the system, this process may be carried out to render the information set to a user.

At some point, in accordance with an information retention policy, the information set is selected for purging. To purge the information set, all that needs to be done is to delete the associated key. Once that is done, all copies of the encrypted information set stored within the information system are made unrenderable; as a result, the information set is effectively "purged" from the system. Notice that it is not necessary to delete the encrypted information set from the system. The information set is made unrenderable, and hence, purged even if the encrypted information set remains physically in the information system. Thus, the present invention eliminates the need to find and to delete each and every copy of the information set. By doing so, the present invention transforms the potentially daunting and highly difficult task of finding and deleting every instance of an information set into a simple one of deleting a key. Not only does this simplify the information retention process, but it also increases the effectiveness of the process because it solves the "stray copy" problem. As noted above, even if a copy of the encrypted information set remains in the system, no harm is done because the encrypted information set cannot be rendered. Consequently, the present invention provides a significantly improved information retention mechanism.

DETAILED DESCRIPTION OF THE EMBODIMENT(S)

Figure 1:
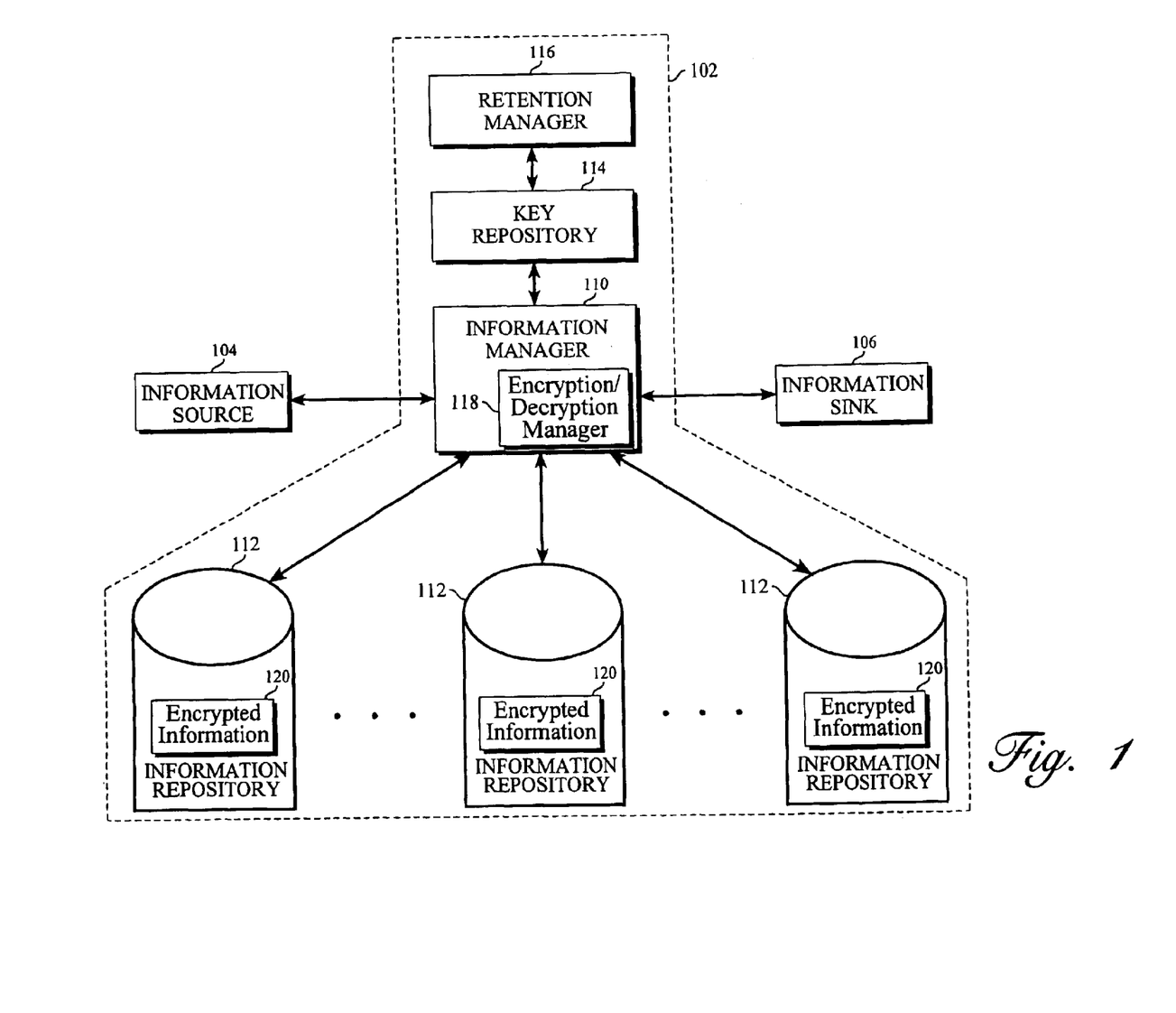
FIG. 1 is a block diagram of a system in which the present invention may be implemented.

With reference to FIG. 1, there is shown a block diagram of a system in which the present invention may be implemented, the system comprising an information system 102, an information source 104, and an information sink 106. For the sake of simplicity, only one information source 104 and one information sink 106 are shown; however, it should be noted that multiple information sources and information sinks may interact with the information system 102. For purposes of the present invention, the information source 104 represents any mechanism capable of originating and providing one or more information sets to the information system 102. Similarly, the information sink 106 represents any mechanism capable of receiving one or more information sets from the information system 102, and rendering the information set to a user. In this regard, information source 104 and information sink 106 may be, but are not limited to being, general purpose computers running client software. The information source 104 and information sink 106 may be coupled to the information system 102 via a direct connection or via a network.

It should be noted that the information source 104 and information sink 106 may be the same mechanism. At one point, a mechanism may provide an information set to the information system 102, and hence, act as an information source. At another time, that same mechanism may receive an information set from the information system 102, and hence, act as an information sink. Thus, the same mechanism may be capable of performing both roles.

The information system 102 is the overall entity responsible for storing and maintaining information sets. As used herein, the term "information set" refers broadly to any type of information, including but not limited to files, messages, web pages, communications, cryptographic keys, access codes, etc. This information may take on many different forms, including but not limited to text, graphics, audio/video, data, etc. All such forms are within the scope of the present invention. Essentially, any type of information that can be stored and retrieved may be managed by information system 102.

The information system 102 may take on many different forms. For example, information system 102 may be a file server responsible for managing access to files stored within one or more repositories. In such an implementation, the information source 104 and information sink 106 would be clients of the file server. The information system 102 may also be a web server responsible for providing web pages to clients in response to access requests. In such a case, the information source 104 would be a content providing mechanism (e.g. an ftp client), and the information sink 106 would be a web browser. In addition, the information system 102 may also be a mail server responsible for managing access to electronic mail (email) messages. In such an implementation, the information source 104 and information sink 106 would be mail clients of the mail server. These and other implementations of the information system 102 are within the scope of the present invention.

Whatever form the information system 102 takes, it comprises an information manager 110, one or more information repositories 112, a key repository 114, and a retention manager 116. The information manager 110 is primarily responsible for interfacing with the information source 104 and the information sink 106. More specifically, the information manager 110 receives one or more information sets from the information source 104, and stores them into one or more of the information repositories 112. In addition, the information manager 110 accesses one or more information sets from the repositories 112, and provides them to the information sink 106. In performing these tasks, the information manager 110 processes the information sets in accordance with the methodology of the present invention. In one embodiment, the information manager 110 comprises an encryption engine 118. As will be elaborated upon in a later section, the encryption engine 118 is used to encrypt information sets prior to storing them into the repositories 112, and to decrypt information sets prior to providing them to the information sink 106. For purposes of the invention, the encryption engine 118 may implement any known encryption methodology, including but not limited to single key encryption and symmetric key encryption. In one embodiment, the information manager 110 is implemented as a set of instructions executable by one or more processors. However, if so desired, the encryption engine 118 and, optionally, the information manager 110 as a whole may be implemented using special purpose, hard-wired logic components. This and other implementations are within the scope of the present invention.

The keys used by the information manager 110 to encrypt and to decrypt the information sets are maintained in the key repository 114. Depending upon the encryption methodology implemented by the encryption engine 118, the form of the keys may differ. For example, the keys may be single keys or symmetric key pairs (e.g. public/private keys). In one embodiment, each key or key set has a key ID associated therewith. These ID's enables the keys to be easily referenced, accessed, and manipulated.

The content of the key repository 114 is managed by the retention manager 116. More specifically, the retention manager 116 is responsible for implementing an information retention policy to determine which keys to delete from the key repository 114. As will be explained in a later section, deleting a key from the key repository 114 in effect purges from the information system 102 all information sets associated with that key. Thus, by managing the keys in the key repository 114, the retention manager 116 in effect manages the retention of information sets within the information system 102. In performing this management function, the retention manager 116 may implement any desired retention policy. For example, retention manager 116 may implement a time-based policy whereby keys are deleted from the key repository 114 after having been in the system 102 for a certain amount of time. The retention manager 116 may also implement a condition-based policy, whereby keys are deleted upon the satisfaction of one or more conditions. In addition, retention manager 116 may implement a classification-based policy, whereby all keys having a certain classification are deleted at a certain time. These and other policies (or combinations thereof) may be implemented by the retention manager 116 within the spirit of the invention. In one embodiment, the retention manager 116 is implemented as a set of instructions executable by one or more processors. However, if so desired, the retention manager 116 may be implemented using special purpose, hard-wired logic components. This and other implementations are within the scope of the present invention.

Figure 2:
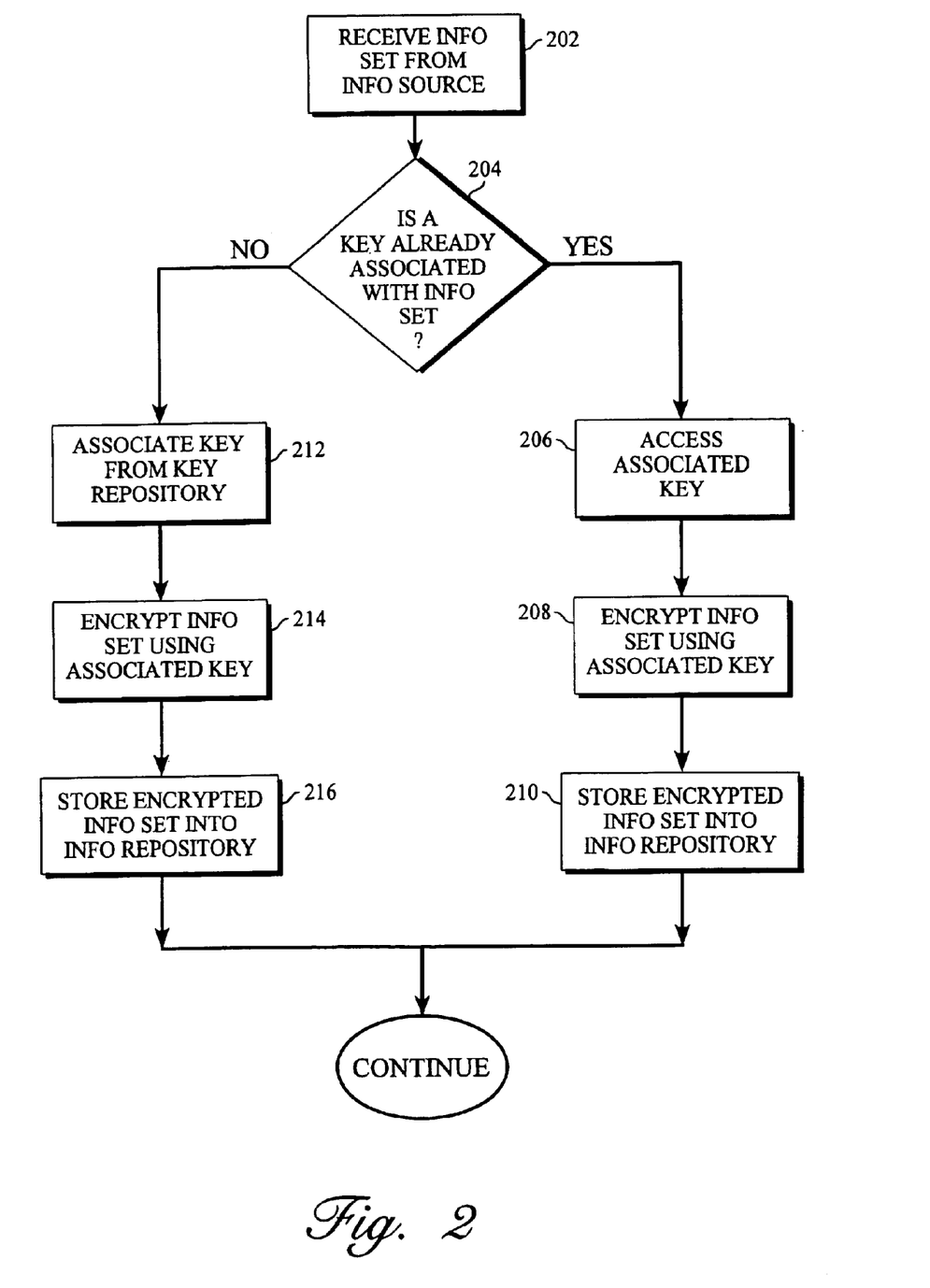
FIG. 2 is a flow diagram showing the operation of the information manager in response to an information set from an information source.
Figure 3:
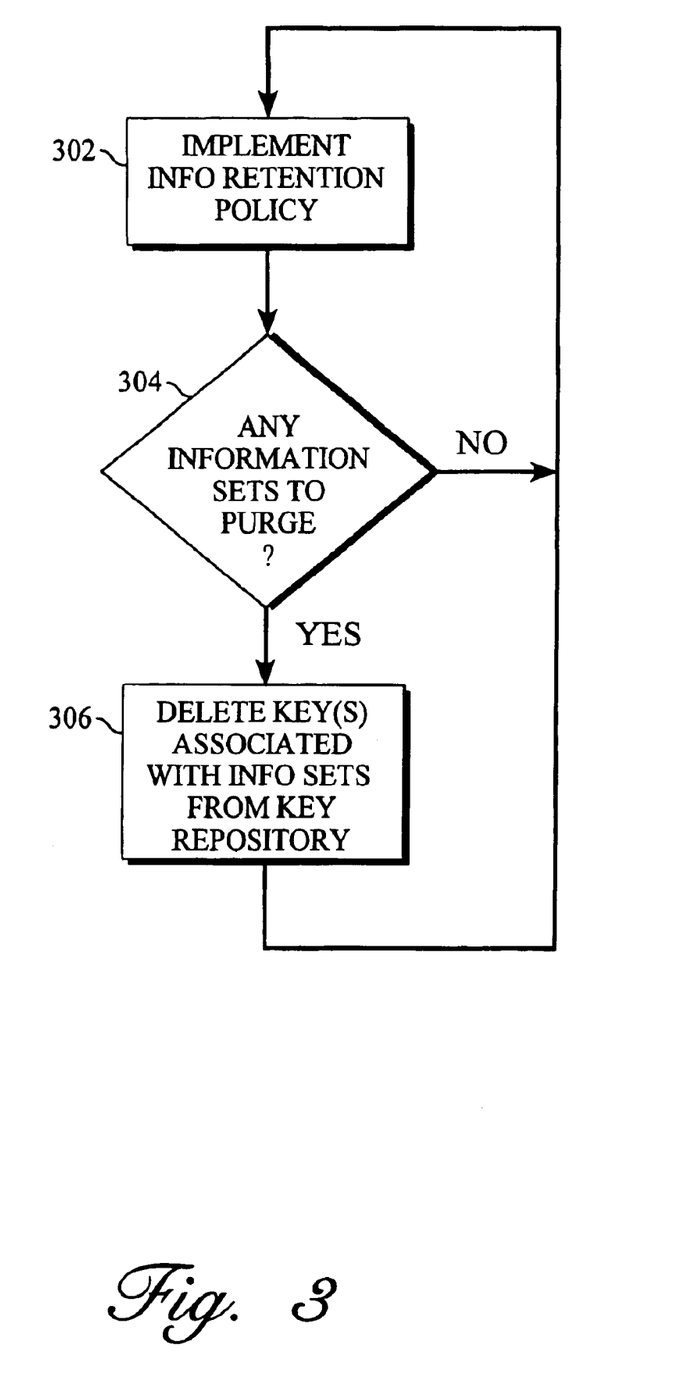
FIG. 3 is a flow diagram showing the operation of the retention manager.
Figure 4:
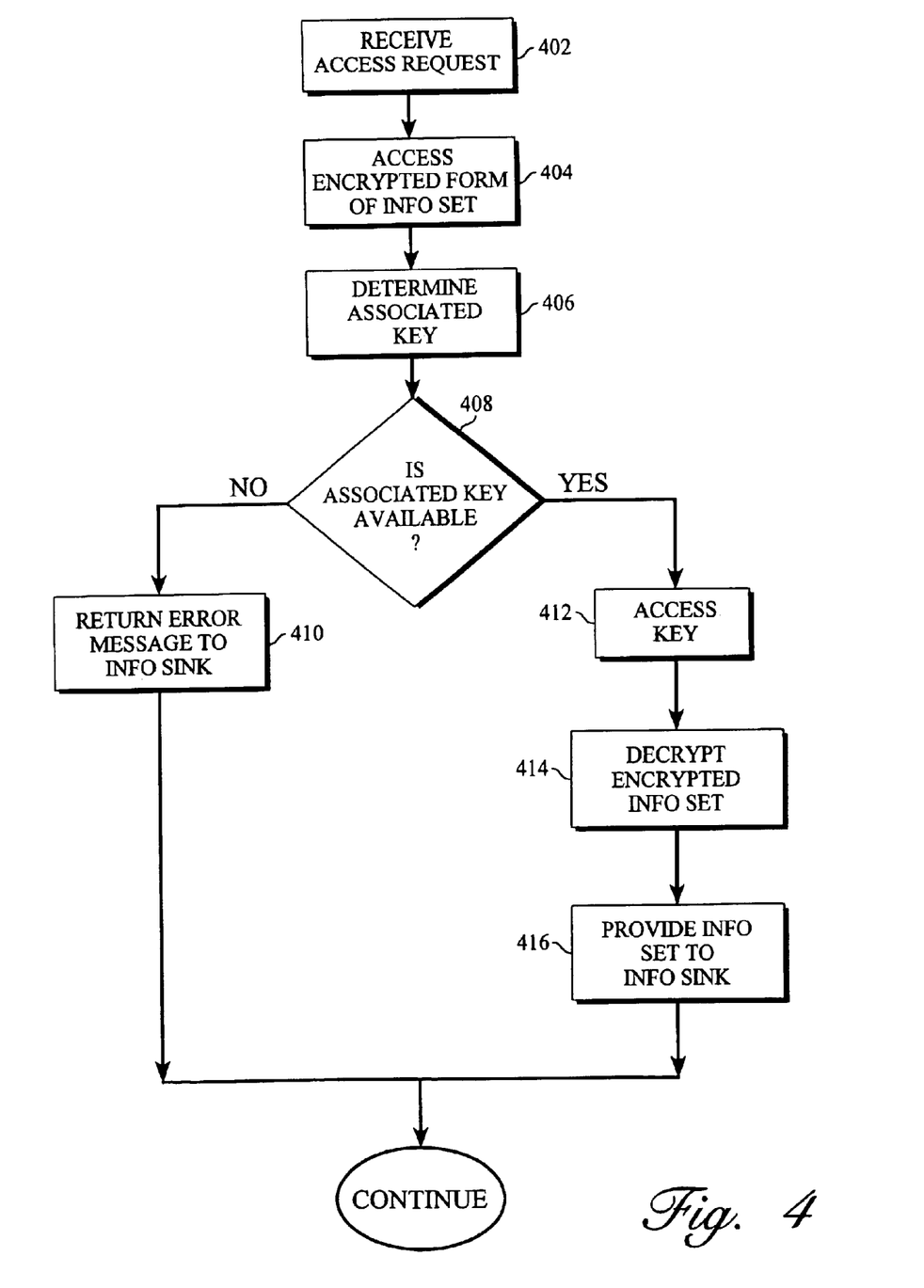
FIG. 4 is a flow diagram showing one embodiment of the operation of the information manager in providing an information set to an information sink.

With reference to the system diagram of FIG. 1 and the flow diagrams of FIGS. 2–4, the operation of the information system 102 will now be described. FIG. 2 shows the operation of the information manager 110 when it receives and stores an information set from an information source 104. FIG. 3 shows the operation of the retention manager 116 in managing the content of the key repository 116, and FIG. 4 illustrates the operation of the information manager 110 when it accesses and provides an information set to an information sink 104.

Referring first to FIG. 2, whenever the information manager 110 receives (202) an information set from an information source 104, it makes a determination (204) as to whether a key has already been associated with that information set. In one embodiment, this is done by checking the header of the information set for a key ID. If no key ID is found, then it means that the information set has not been previously stored in the information system 102. In such a case, the information manager 110 selects (212) a key from the key repository 114 to associate with this information set. This key selection may be performed based upon any predetermined policy. For example, the key may be selected based upon the current date so that the key of the day is selected, or the selection may be based upon the classification of the information set (e.g. highly confidential, confidential, and generally available). For purposes of the present invention, any key selection policy may be implemented.

Once the key (having a key ID associated therewith) is selected, the information manager 110 encrypts (214) the information set using the selected key, and then stores (216) the encrypted information set 120 into one or more of the persistent information repositories 112. As part of the storage process, the information manager 110 writes the key ID into the header (which remains unencrypted) of the encrypted information set 120. This key ID associates the selected key with the encrypted information set 120, and enables the proper key to be accessed at a later time from the key repository 114 to allow the encrypted information set 120 to be decrypted. An information set is thus persistently stored within the information system 102.

An important point to note is that only the encrypted form of the information set 120 is persistently stored within the information system 102. The unencrypted if information set does not get persistently stored. This is important in preserving the integrity of the information retention policy implemented by the retention manager 116, as will be discussed below. It is understood that in order to encrypt the information set, the information manager 110 needs to have, at some point, at least a portion of the unencrypted information set in volatile, non-persistent memory. This does not pose a problem. So long as the unencrypted information set is not stored in persistent storage, the information retention policy will not be undermined.

Returning now to (204) of FIG. 2, if it is determined that a key has already been associated with the information set (as may be the case if the information set had already been stored in the information system 102, and had been provided to the information source 104), then the information manager 110 extracts the key ID from the header of the information set, and uses the key ID to access (206) the associated key in the key repository 114. Once the associated key is accessed, the information manager 110 encrypts (208) the information set using the associated key, and stores (210) the encrypted information set 120 into one or more of the persistent information repositories 112. As part of the storage process, the information manager 110 rewrites the key ID into the header of the encrypted information set 120. The encrypted information set 120 is thus stored within the information system 102. As noted previously, only the encrypted form 120 of the information set is persistently stored within the information system 102. The unencrypted information set is not persistently stored.

Once the encrypted information set 120 is stored within the information system 102, it can be managed by the retention manager 116. More specifically, the retention manager 116 can control whether the encrypted information set 120 is retained or purged from the system 102. For purposes of the present invention, the term "purge" is defined broadly to mean making a set of information unrenderable to a user. Under this definition, it is not necessary to delete an information set from a system in order to purge it. Rather, all that is necessary is to make the information set unrenderable to a user. If the information set is made unrenderable, then it is for all intents and purposes useless, so that it is effectively "purged" from the system even if it remains physically within the system. In the present invention, information sets are stored in the information system 102 only in encrypted form. In such a system, it is an easy matter to make an information set unrenderable. All that needs to be done is to delete the key needed to decrypt the encrypted information set. Once that is done, all instances of the encrypted information set are made unrenderable. Thus, the present invention transforms the task of managing information retention into one of managing keys. By managing the keys in the key repository 114, the retention manager 116 controls whether information sets are retained or purged from the information system 102.

Referring now to FIG. 3, the retention manager 116 operates by first implementing (302) a predetermined information retention policy. This policy sets forth the criteria for determining if and when an information set is to be purged from the information system 102. For example, this retention policy may be time-based, so that information sets are purged after having been in the system 102 for a certain amount of time, or condition-based, so that information sets are purge upon the satisfaction of one or more conditions or classification-based, so that information sets having a certain classification are purged at a certain time. These and other retention policies (or combinations thereof) may be implemented by the retention manager 116.

Based upon the retention policy, the retention manager 116 determines (304) whether any information sets need to be purged from the information system 102. If none need to be purged, then the retention manager 116 loops back to (302). However, if one or more information sets need to be purged, then the retention manager 116 deletes (306) from the key repository 114 the key(s) associated with the encrypted versions of those information set(s) 120. By doing so, the retention manager 116 makes those encrypted information sets 120 unrenderable, thereby, effectively purging them from the system 102. Notice that it is not necessary to delete the encrypted information sets 120 (although it may be desirable to do so at some point to free up storage space). By eliminating the need to delete information sets from the system, the present invention eliminates the need to find each and every instance of an information set. This serves to greatly simplify the information retention management process.

In addition to storing information sets into the system 102, the information manager 110 also manages access to information sets already stored within the system 102. In one embodiment, the information manager 110 carries out this management task in accordance with the flow diagram of FIG. 4. Initially, the information manager 110 receives (402) a request from an information sink 106 to access a specific information set within the information system 102. In response to this request, the information manager 110 accesses (404) from the one or more repositories 112 the encrypted form 120 of the requested information set, and then determines (406) the key associated with the encrypted information set 120. In one embodiment, this is done by extracting a key ID from the header of the encrypted information set 120. Armed with the key ID, the information manager 110 searches the key repository 114 to determine (408) whether the key associated with the key ID is available. If the key repository 114 does not have a key associated with the key ID, then it means that the associated key has been deleted. This in turn means that the requested information set was previously purged by the retention manager 116. If that is the case, then the information manager 110 returns (410) an error message to the information sink 106 to inform the information sink 106 that the requested information set has been purged from the system 102 and hence, can no longer be rendered. In this manner, the purging of the requested information set is manifested.

Returning to (408), if the information manager 110 determines that a key associated with the key ID is available, then it accesses (42) the associated key in the key repository 114. Armed with the key, the information manager 110 decrypts (414) the encrypted information set 120 to derive the original information set. The information manager 110 then provides (416) the unencrypted information set to the information sink 106 for rendering to a user. An information set is thus accessed from the information system 102 and rendered. In accordance with one embodiment: (1) the encrypted information set 120 is decrypted only when it is necessary to render the information set to a user; and (2) the information sink 106 comprises sufficient logic to prevent it from persistently storing the unencrypted information set. These considerations help to prevent the undermining of the retention policy.

Figure 5:
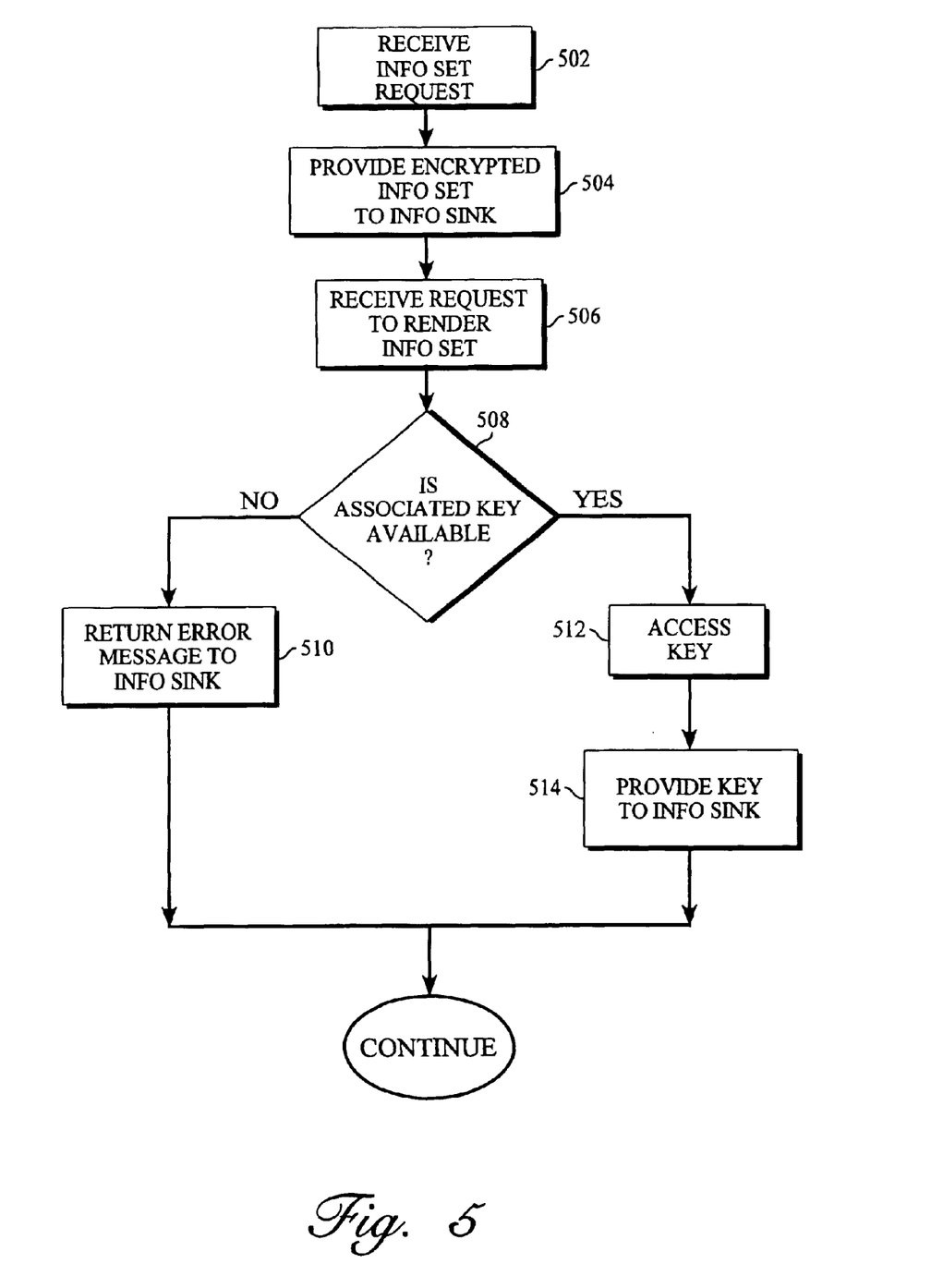
FIG. 5 is a flow diagram showing an alternative embodiment of the operation of the information manager in providing an information set to an information sink.

Thus far, the information manager 110 has been described as being the component responsible for decrypting the encrypted information set 120. As an alternative, the decryption function may be delegated to the information sink 106. FIG. 5 is a flow diagram showing the operation of the information manager 110 where the decryption task has been delegated to the information sink 106. As shown, the information manager 110 initially receives (502) a request from the information sink 106 for a specific information set within the information system 102. In response to this request, the information manager 110 accesses the encrypted form 120 of the requested information set from the one or more repositories 112, and provides (504) the encrypted information set 120 to the information sink 106. Included with the encrypted information set 120 is the unencrypted header which contains a key ID. Since it is the encrypted form of the information set that is provided, the information sink 106 may freely store the encrypted information set in its own persistent storage.

At some point, the information sink 106 may need to render the information set to a user. To do so, the information sink 106 needs the key associated with the encrypted information set. The information sink 106 acquires this key by: (1) extracting the key ID from the header of the encrypted information set; and (2) sending a key request, which includes the extracted key ID, to the information manager 110. Upon receiving (506) this request, the information manager 110 searches the key repository 114 to determine (508) whether the key associated with the key ID is available. If the key repository 114 does not have a key associated with the key ID, then it means that the associated key has been deleted. This in turn means that the encrypted information set was previously purged by the retention manager 116. If that is the case, then the information manager 110 returns (510) an error message to the information sink 106 to inform the information sink 106 that the encrypted information set has been purged from the system 102 and hence, can no longer be rendered.

On the other hand, if the information manager 110 determines (508) that a key associated with the key ID is available, then it accesses (512) the associated key in the key repository 114, and provides (514) it to the information sink 106. Armed with the key, the information sink 106 decrypts the encrypted information set and renders it to the user. In accordance with one embodiment: (1) the encrypted information set 120 is decrypted only when it is necessary to render the information set to the user; and (2) the information sink 106 comprises sufficient logic to prevent it from persistently storing the key received from the information manager 110. These considerations help to prevent the undermining of the retention policy. In the manner described, the present invention provides an improved mechanism for managing information retention in an information system.

Hardware Overview

Figure 6:
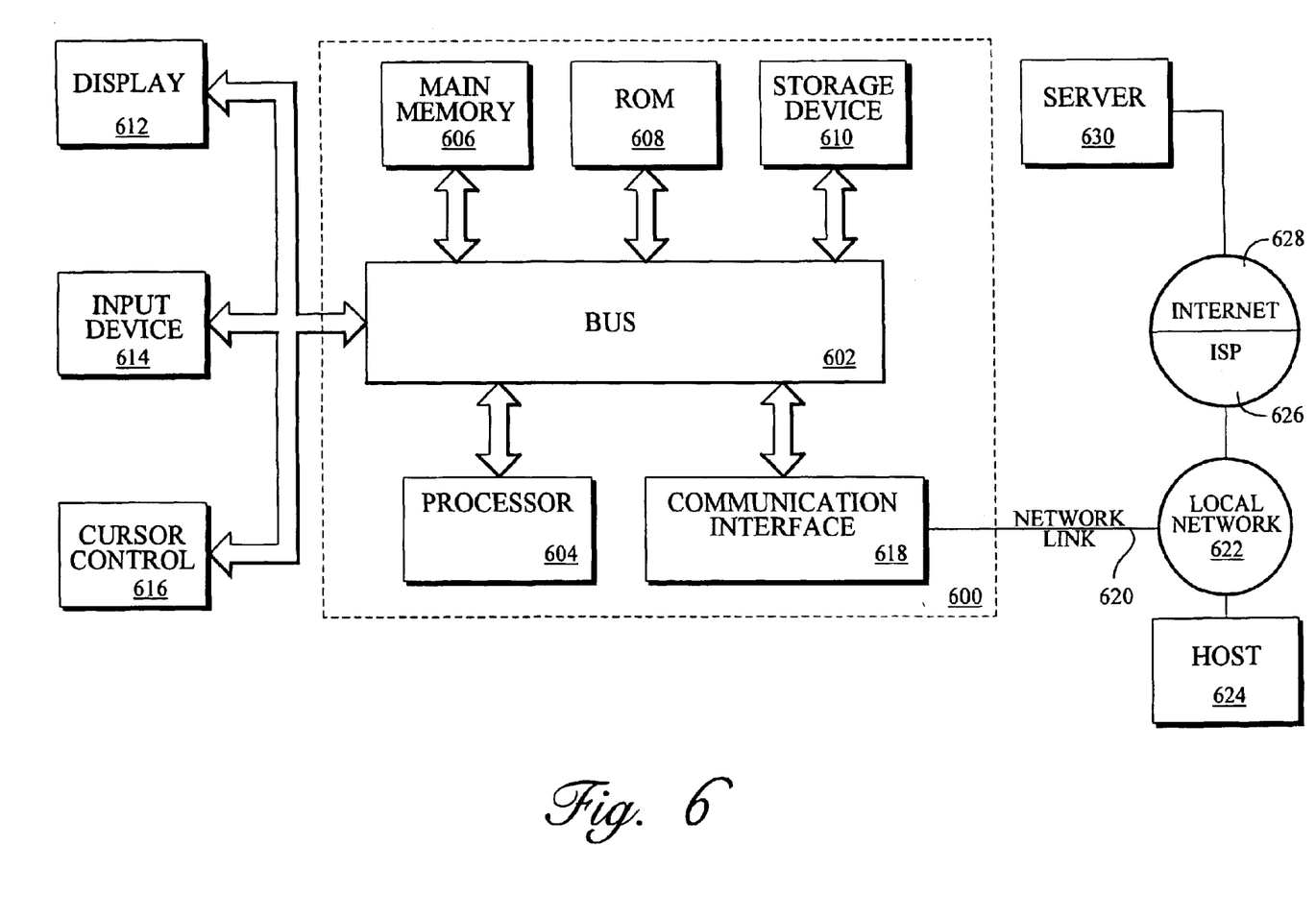
FIG. 6 is a block diagram of a hardware computer system in which various components of the present invention may be implemented.

FIG. 6 is a block diagram that illustrates a computer system 600 in which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. In addition, main memory 606 may be further used for storing temporary variables or other intermediate information during execution of instructions by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

According to one embodiment, the functionality of the information manager 110 and the retention manager 116 of the present invention are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software. The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network line 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to specific embodiments, it should not be construed to be so limited. Various modifications can be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method for managing information retention in a system, comprising:

receiving a set of information into a system;

associating one or more keys with said set of information;

encrypting said set of information using said one or more keys;

storing said set of information in encrypted form into one or more repositories, wherein only the encrypted form of the set of information is persistently stored within the information system and no unencrypted form of the set of information is persistently stored within the information system;

purging said set of information from the system so that said set of information is not available to a user from the system by deleting said one or more keys, thereby making said set of information unrenderable;

prior to deletion of said one or more keys, receiving a request from an information sink to render said set of information to a user accessing the encrypted form of said set of information from the one or more repositories;

accessing said one or more keys;

providing the encrypted form of said set of information and said one or more keys to the information sink to enable the information sink to decrypt the encrypted form of said set of information; and using said one or more keys to render said set of information to the user, wherein the information sink comprises sufficient logic to prevent it from persistently storing said one or more keys received from an information manager.

2. The method of claim 1, wherein said set of information is purged from the system without requiring that the encrypted form of said set of information be deleted from the one or more repositories.

3. The method of claim 1, wherein said set of information is stored in the one or more repositories only in encrypted form.

4. The method of claim 1, wherein said one or more keys comprises a symmetrically paired set of keys.

5. The method of claim 1, further comprising:

prior to deletion of said one or more keys, receiving a request from an information sink to render said set of information to a user;

accessing the encrypted form of said set of information from the one or more repositories;

decrypting the encrypted form of said set of information using said one or more keys to derive said set of information; and providing said set of information to the information sink to render said set of information to the user.

6. The method of claim 5, wherein said set of information is stored in the one or more repositories only in encrypted form, and wherein the encrypted form of said set of information is decrypted only when it is necessary to render said set of information to the user.

7. The method of claim 1, wherein said set of information is stored in the one or more repositories only in encrypted form, and wherein the encrypted form of said set of information is decrypted only when it is necessary to render said set of information to the user.

8. The method of claim 1, wherein purging comprises:
- determining, based upon an information retention policy, whether said set of information should be purged from the system; and
- in response to a determination that said set of information should be purged from the system, purging said set of information from the system by deleting said one or more keys, thereby making said set of information unrenderable.

9. The method of claim 8, wherein said information retention policy is time-based such that said set of information is purged after a certain period of time.

10. The method of claim 8, wherein said information retention policy is condition-based such that said set of information is purged when one or more conditions are satisfied.

11. An apparatus for managing information retention in a system, comprising:
- a mechanism for receiving a set of information into a system;
- a mechanism for associating one or more keys with said set of information;
- a mechanism for encrypting said set of information using said one or more keys;
- a mechanism for storing said set of information in encrypted form into one or more repositories, wherein only the encrypted form of the set of information is persistently stored within the information system and no unencrypted form of the set of information is persistently stored within the information system;
- a mechanism for purging said set of information from the system so that said set of information is not available to a user from the system by deleting said one or more keys, thereby making said set of information unrenderable;
- a mechanism for receiving prior to deletion of said one or more keys, a request from an information sink to render said set of information to a user;
- a mechanism for accessing the encrypted form of said set of information from the one or more repositories;
- a mechanism for accessing said one or more keys;
- a mechanism for providing the encrypted form of said set of information and said one or more keys to the information sink to enable the information sink to decrypt the encrypted form of said set of information; and
- using said one or more keys to render said set of information to the user, wherein the information sink comprises sufficient logic to prevent it from persistently storing said one or more keys received from an information manager.

12. The apparatus of claim 11, wherein said set of information is purged from the system without requiring that the encrypted form of said set of information be deleted from the one or more repositories.

13. The apparatus of claim 11, wherein said set of information is stored in the one or more repositories only in encrypted form.

14. The apparatus of claim 11, wherein said one or more keys comprises a symmetrically paired set of keys.

15. The apparatus of claim 11, further comprising:
- a mechanism for receiving, prior to deletion of said one or more keys, a request from an information sink to render said set of information to a user;
- a mechanism for accessing the encrypted form of said set of information from the one or more repositories;
- a mechanism for decrypting the encrypted form of said set of information using said one or more keys to derive said set of information; and
- a mechanism for providing said set of information to the information sink to enable the information sink to render said set of information to the user.

16. The apparatus of claim 15, wherein said set of information is stored in the one or more repositories only in encrypted form, and wherein the encrypted form of said set of information is decrypted only when it is necessary to render said set of information to the user.

17. The apparatus of claim 11, wherein said set of information is stored in the one or more repositories only in encrypted form, and wherein the encrypted form of said set of information is decrypted by the information sink only when it is necessary to render said set of information to the user.

18. The apparatus of claim 11, wherein the mechanism for purging comprises:
- a mechanism for determining, based upon an information retention policy, whether said set of information should be purged from the system; and
- a mechanism for deleting, in response to a determination that said set of information should be purged from the system, said one or more keys, thereby making said set of information unrenderable.

19. The apparatus of claim 18, wherein said information retention policy is time-based such that said set of information is purged after a certain period of time.

20. The apparatus of claim 18, herein said information retention policy is condition-based such that said set of information is purged when one or more conditions are satisfied.

21. A computer readable medium having stored thereon instructions which, when executed by one or more processors, cause the one or more processors to manage information retention in a system, comprising:
- instructions for causing one or more processors to receive a set of information into a system;
- instructions for causing one or more processors to associate one or more keys with said set of information;
- instructions for causing one or more processors to encrypt said set of information using said one or more keys;
- instructions for causing one or more processors to store said set of information in encrypted form into one or more repositories;
- wherein only the encrypted form of the set of information is persistently stored within the information system and no unencrypted form of the set of information is persistently stored within the information system,
- instructions for causing one or more processors to purge said set of information from the system so that said set of information is not available to a user from the system by deleting said one or more keys, thereby making said set of information unrenderable;
- instructions for causing one or more processors to receive, prior to deletion of said one or more keys, a request from an information sink to render said set of information to a user;
- instructions for causing one or more processors to access the encrypted form of said set of information from the one or more repositories;
- instructions for causing one or more processors to access said one or more keys;
- instructions for causing one or more processors to provide the encrypted form of said set of information and said one or more keys to the information sink to enable the information sink to decrypt the encrypted form of said set of information; and instructions for using said one or more keys to render said set of information to the user, wherein the information sink comprises sufficient logic to prevent it from persistently storing said one or more keys received from an information manager.

22. The computer readable medium of claim 21, wherein said set of information is purged from the system without requiring that the encrypted form of said set of information be deleted from the one or more repositories.

23. The computer readable medium of claim 21, wherein said set of information is stored in the one or more repositories only in encrypted form.

24. The computer readable medium of claim 21, wherein said one or more keys comprises a symmetrically paired set of keys.

25. The computer readable medium of claim 21, further comprising:

instructions for causing one or more processors to receive, prior to deletion of said one or more keys, a request from an information sink to render said set of information to a user;

instructions for causing one or more processors to access the encrypted form of said set of information from the one or more repositories;

instructions for causing one or more processors to decrypt the encrypted form of said set of information using said one or more keys to derive said set of information; and instructions for causing one or more processors to provide said set of information to the information sink to enable the information sink to render said set of information to the user.

26. The computer readable medium of claim 25, wherein said set of information is stored in the one or more repositories only in encrypted form, and wherein the encrypted form of said set of information is decrypted only when it is necessary to render said set of information to the user.

27. The computer readable medium of claim 21, wherein said set of information is stored in the one or more repositories only in encrypted form, and wherein the encrypted form of said set of information is decrypted by the information sink only when it is necessary to render said set of information to the user.

28. The computer readable medium of claim 21, wherein the instructions for causing one or more processors to purge said set of information from the system comprises:

instructions for causing one or more processors to determine, based upon an information retention policy, whether said set of information should be purged from the system; and instructions for causing one or more processors to delete, in response to a determination that said set of information should be purged from the system, said one or more keys, thereby making said set of information unrenderable.

29. The computer readable medium of claim 28, wherein said information retention policy is time-based such that said set of information is purged after a certain period of time.

30. The computer readable medium of claim 28, wherein said information retention policy is condition-based such that said set of information is purged when one or more conditions are satisfied.

* * * * *

UNITED STATES PATENT AND TRADEMARK OFFICE
CERTIFICATE OF CORRECTION

PATENT NO. : 6,915,435 B1
DATED : July 5, 2005
INVENTOR(S) : Charles Merriam It is certified that error appears in the above-identified patent and that said Letters Patent is hereby corrected as shown below:

Column 12,
Line 30, please delete the word "herein" and replace with the word -- wherein --.

Signed and Sealed this

Thirtieth Day of August, 2005

JON W. DUDAS
*Director of the United States Patent and Trademark Office*